(12) United States Patent
Marinov et al.

(10) Patent No.: US 11,148,214 B2
(45) Date of Patent: Oct. 19, 2021

(54) RAIL STOP SYSTEM FOR A SLIDING SAW

(71) Applicant: Robert Bosch GmbH, Stuttgart (DE)

(72) Inventors: Plamen V. Marinov, Mount Prospect, IL (US); Gwendolyn McDonald, Barrington Hills, IL (US); Darek Smolinski, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 110 days.

(21) Appl. No.: 16/585,298

(22) Filed: Sep. 27, 2019

(65) Prior Publication Data

US 2020/0030896 A1 Jan. 30, 2020

Related U.S. Application Data

(62) Division of application No. 14/774,058, filed as application No. PCT/US2014/021580 on Mar. 7, 2014, now Pat. No. 10,442,018.

(60) Provisional application No. 61/776,932, filed on Mar. 12, 2013.

(51) Int. Cl.
*B23D 47/02* (2006.01)
*B23D 45/04* (2006.01)
*B27B 5/29* (2006.01)

(52) U.S. Cl.
CPC .......... *B23D 47/02* (2013.01); *B23D 45/048* (2013.01); *B27B 5/29* (2013.01)

(58) Field of Classification Search
CPC .... B23D 47/02; B23D 47/025; B23D 47/042; B23D 47/044; B23D 47/046; B23D 47/048; B27B 5/201; B27B 5/206; B27B 5/207; B27B 5/208; B27B 5/29; B27G 19/02

See application file for complete search history.

(56) References Cited

U.S. PATENT DOCUMENTS

| | | | |
|---|---|---|---|
| 1,311,508 A * | 7/1919 | Harrold | B27G 19/02 83/860 |
| 2,558,217 A | 6/1951 | Hess et al. | |
| 3,693,773 A | 9/1972 | Wickham et al. | |
| 4,805,505 A | 2/1989 | Cantlin | |
| 6,997,091 B1 | 2/2006 | Shibata | |
| 7,752,950 B2 | 7/2010 | Hu | |

(Continued)

OTHER PUBLICATIONS

International Search Report corresponding to PCT Application No. PCT/US2014/021580, dated Jun. 19, 2014 (3 pages).

*Primary Examiner* — Andrea L Wellington
*Assistant Examiner* — Samuel A Davies
(74) *Attorney, Agent, or Firm* — Maginot, Moore & Beck LLP

(57) ABSTRACT

A rail system for a power tool has a base defining a work surface for supporting a workpiece, a support mounted to the base, a number of elongated rails slidably supported by the support for movement relative thereto, a yoke engaged to the number of elongated rails for movement with the elongated rails, and a power tool assembly supported by a yoke for performing an operation on the workpiece. A rail stop is movably mounted to one of the support and the yoke, the rail stop including a stop surface adapted to abut the other of the support and the yoke when the rail stop is in a first position between the yoke and the support. The rail stop is movable to a second position different from the first position.

14 Claims, 8 Drawing Sheets

(56) References Cited

U.S. PATENT DOCUMENTS

| | | |
|---|---|---|
| 2003/0088986 A1 | 5/2003 | Ushiwata et al. |
| 2005/0262985 A1 | 12/2005 | Talesky |
| 2006/0185486 A1* | 8/2006 | Firth ..................... B23D 47/02 83/473 |
| 2008/0210072 A1 | 9/2008 | Chang et al. |
| 2009/0151529 A1* | 6/2009 | Miura ................. B23D 47/126 83/471.3 |
| 2009/0235794 A1 | 9/2009 | Inai |
| 2009/0301278 A1 | 12/2009 | Agan et al. |
| 2010/0242699 A1 | 9/2010 | Sasaki et al. |
| 2011/0303065 A1* | 12/2011 | Liu .......................... B27B 5/29 83/471.3 |

* cited by examiner

RAIL STOP SYSTEM FOR A SLIDING SAW

REFERENCE TO RELATED APPLICATION AND PRIORITY CLAIM

This application is a divisional application of U.S. patent application Ser. No. 14/774,058 filed Sep. 9, 2015, which is a 35 U.S.C. § 371 National Stage Application of PCT/US2014/021580, filed on Mar. 7, 2014, which claims the benefit of priority to U.S. Provisional Application No. 61/776,932 filed Mar. 12, 2013, the disclosures of which are incorporated herein by reference in their entireties.

FIELD OF THE DISCLOSURE

The present application present disclosure concerns power tools in which the working tool travels on rails, such as a sliding miter saw, and in particular to modifications to the rail components to accommodate large workpieces.

BACKGROUND

Many power tools include a working tool slidably supported on rails so that the tool can traverse a workpiece, such as the sliding miter power saw 10 shown in FIGS. 1(a)-(b). The power saw includes a saw assembly 12 connected by a yoke 24 to a rail system 20. The rails are slidably supported by a structure, such as a bevel post 22, mounted on a base or platform 14. The saw assembly may be supported on the yoke to be pivoted downward toward the workpiece. The rails 20 allow the saw assembly to be precisely positioned relative to the platform 14, and particularly the workpiece, to make a chop cut for instance. In other procedures, the saw assembly can travel along the rails during to perform a slide cut.

One detriment of current miter saws arises when performing mitered cuts on large workpieces, such as the crown molding C or large base board B shown in FIGS. 1(a), 1(b). The height of the workpiece above the platform 14 challenges the cutting capacity of the typical miter saw because the workpiece interferes with the components of the saw assembly 12. In order to accommodate such large workpieces it is necessary to position the saw blade 13 between the fully extended or fully retracted extremes on the rails, but not at the extremes. Such precise positioning is very difficult to achieve and unforgiving should the rails slide away from the optimal location during the cut.

What is needed is a modified rail system that allows the operator to precisely stop and hold the saw blade assembly at the optimum location for making cuts in large workpieces.

SUMMARY

A rail system for a power tool has a base defining a work surface for supporting a workpiece, a support mounted to the base, a number of elongated rails slidably supported by the support for movement relative thereto, a yoke engaged to the number of elongated rails for movement with the elongated rails, and a power tool assembly supported by a yoke for performing an operation on the workpiece. In one aspect of the present disclosure, a rail stop is movably mounted to one of the support and the yoke, the rail stop including a stop surface adapted to abut the other of the support and the yoke when the rail stop is in a first position between the yoke and the support. The rail stop is movable to a second position different from the first position.

In one feature, the rail stop is an elongated plate that extends parallel to the elongated rails that includes an end portion disposed generally perpendicular to the elongated rails to define the stop surface. In certain embodiments the rail stop is pivotably mounted to pivot between a first position in which the stop surface abuts the other of the support and the yoke and a second position in which the stop surface is no longer between the support and the yoke. In other embodiments, the elongated plate defines a slot along the length of the plate and the one of the support and the yoke includes a pin projecting therefrom into the slot. In one aspect, the slot includes a notch at one end, corresponding to the first position of the rail stop, in which the notch receives the pin to hold the rail stop in the first position abutting the other of the support and the yoke.

DETAILED DESCRIPTION

Figure 1A:
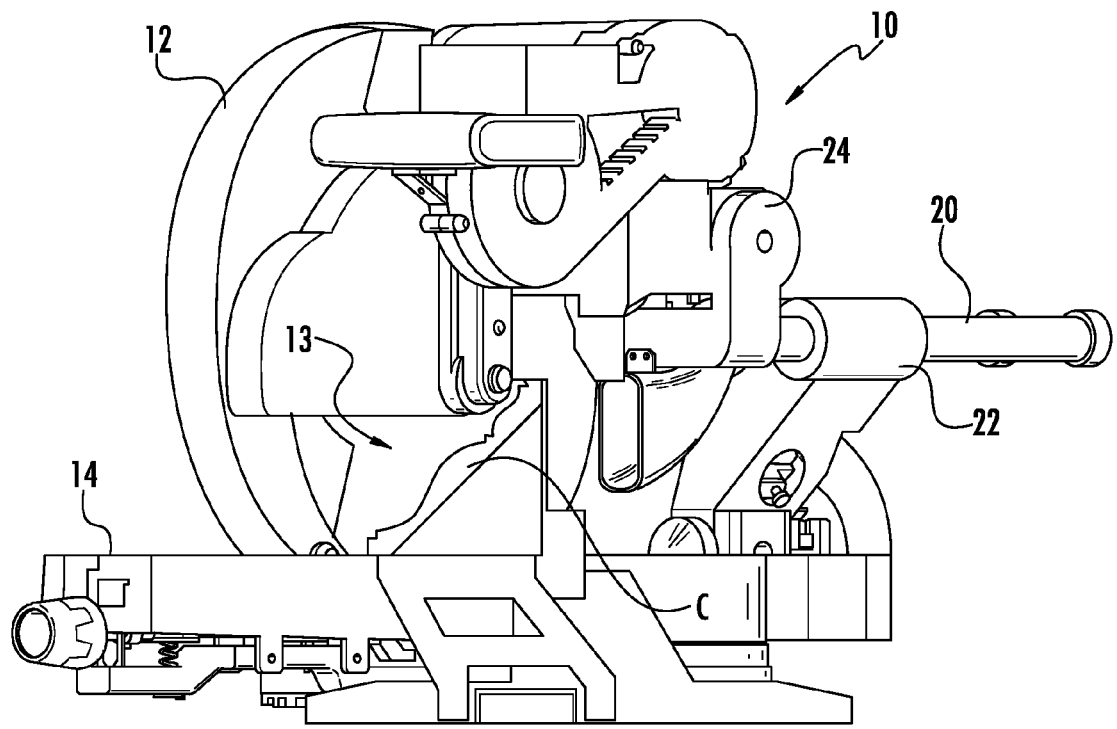
FIGS. 1(a), (b) are perspective views of a sliding miter saw with examples of large workpieces in position for a cut.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2A:
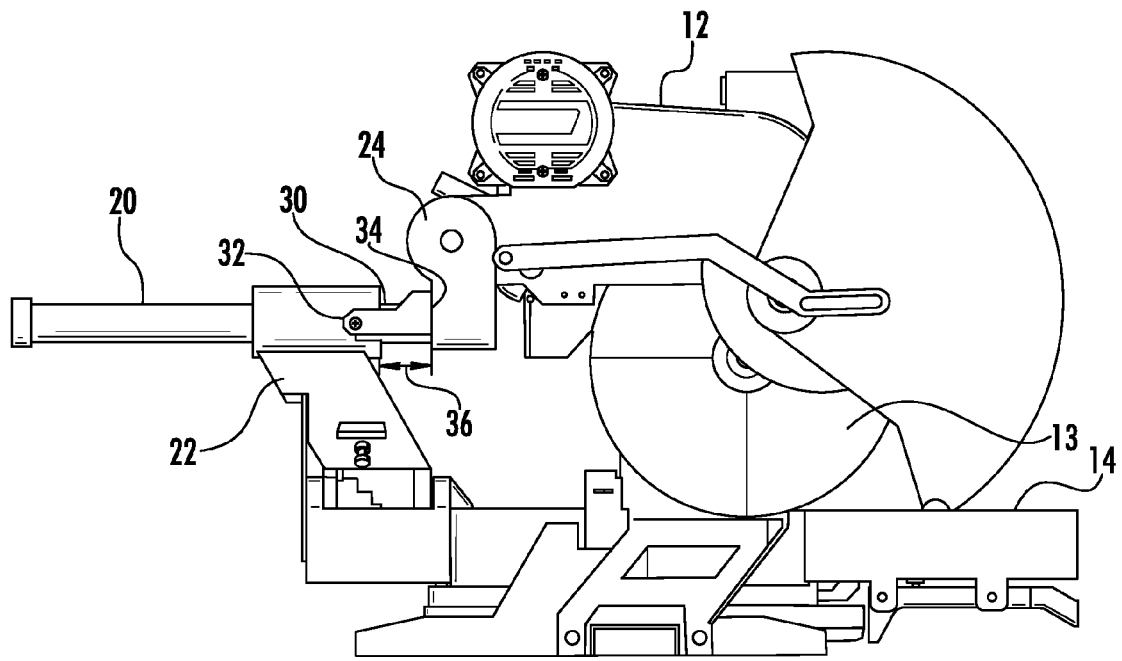
FIGS. 2(a)-(d) are views of a rail stop incorporated into a sliding miter saw, such as the saw of FIGS. 1(a)-(b), with the rail stop shown in deployed and retracted positions.
Figure 2B:
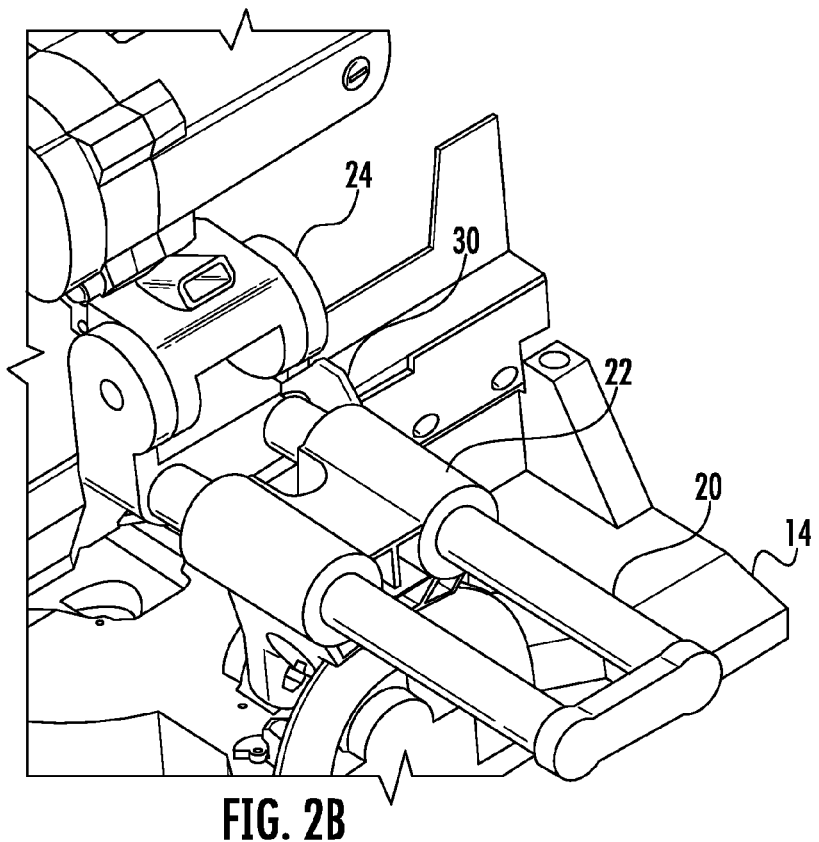
Figure 2C:
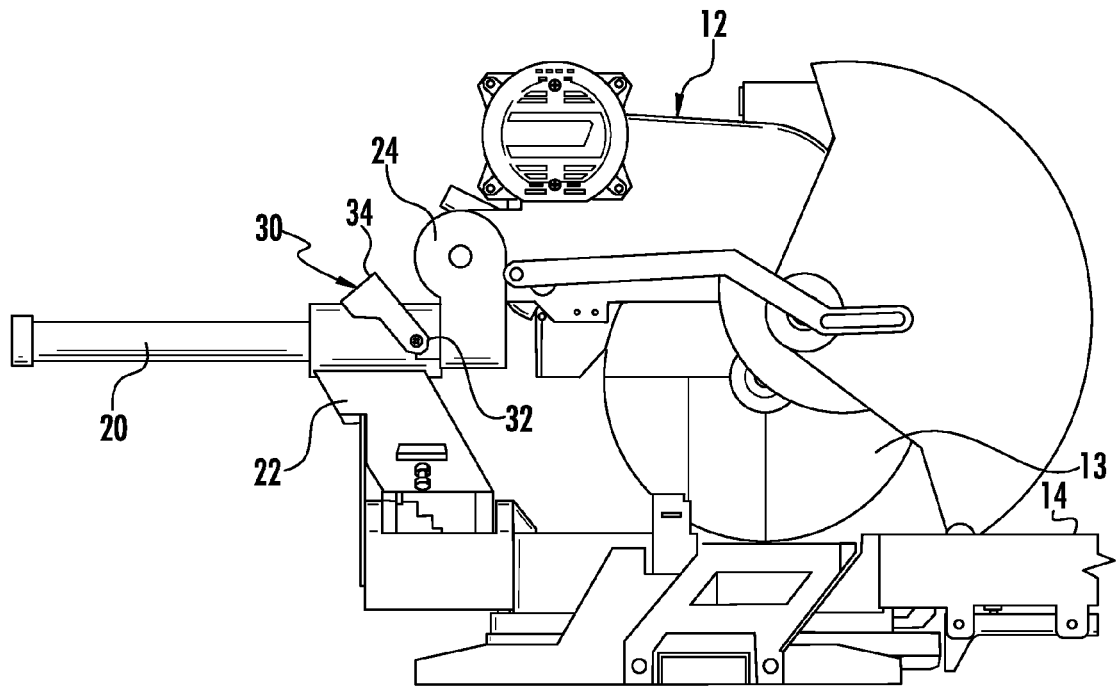
Figure 2D:
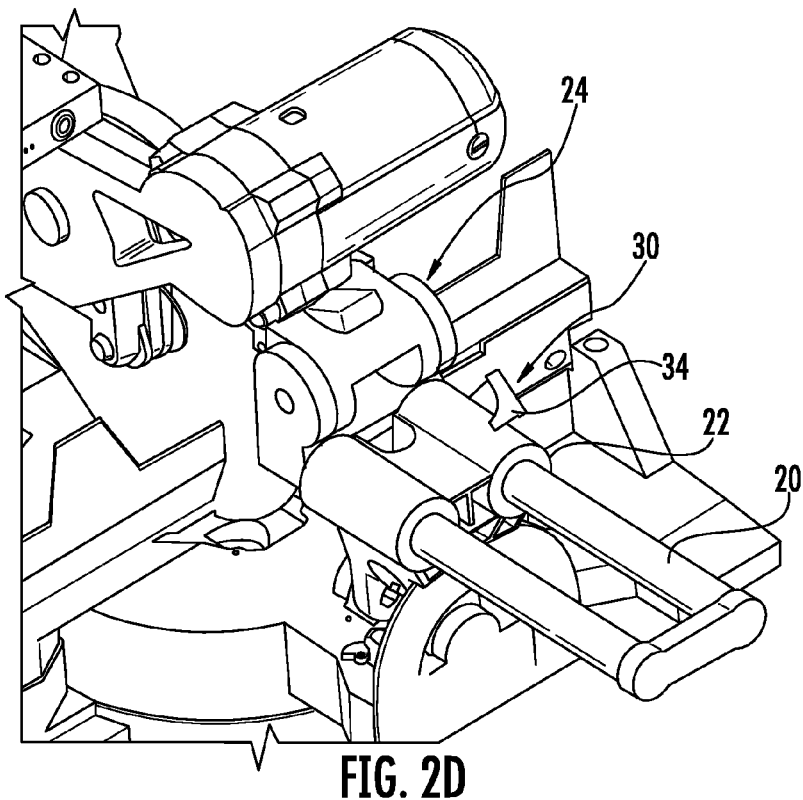
Figure 3:
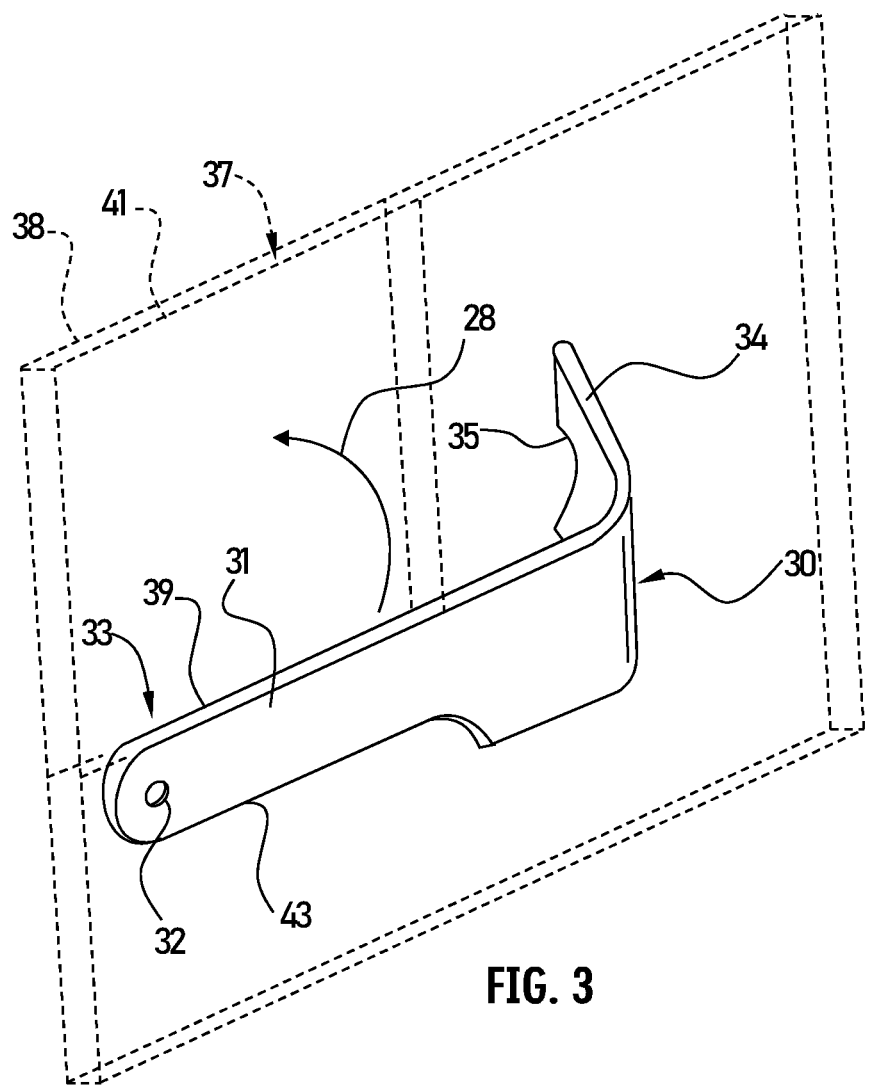
FIG. 3 is an enlarged perspective view of a rail stop plate according to one aspect of the present disclosure.

The above-described problem of making cuts on large workpieces is addressed by incorporating a selectable rail stop into the rail system 20. In one embodiment, a rail stop 30 is mounted to the bevel post 22 at a pivot mount 32, as shown in FIGS. 2(a)-(d). The rail stop 30 may be in the form of an elongated plate 31 that terminates in a right angle end portion 34 that defines a stop surface adapted to abut the yoke 24 of the miter saw. The rail stop is pivotably mounted at the pivot mount 32 in a base portion 33 to pivot in a vertical plane relative to the base between a first position in which the end portion 34 is disposed between the yoke and the bevel post and a second position in which the end portion is no longer between the two components. The end portion 34 may define a cut-out 35 configured to extend around a portion of a rail of the rail system 20, as illustrated in FIGS. 2(b), 3, so that the stop surface of the end portion can be at least partially aligned with the line of travel of the rails system. The vertical or first plane, which is a plane defined, e.g., by the sheet depicting FIG. 2C, is parallel to the rails in the rail assembly 20. Accordingly, when the rail stop 30 pivots about the pivot mount 32 in the direction of the arrow 28, the base portion 33 moves within a base portion path volume 37 defined by a second plane 38 which is defined by a first side 39 of the base portion 33, and defined by a third plane 41 which is defined by a second side 43 of the base portion 33. The second plane 38 and the third plane 41 are parallel to the first plane.

Figure 1B:
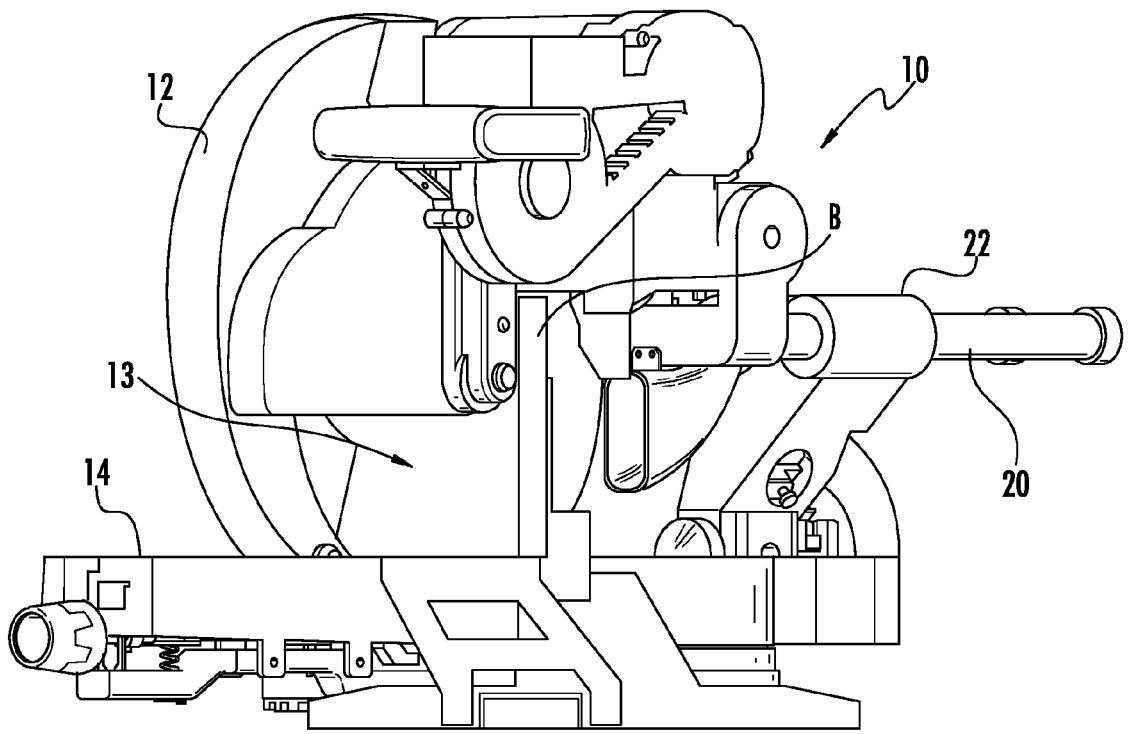

The rail stop plate 30 is sized so that the movement of the saw assembly 12 and rail assembly 20 toward the bevel post 22 is limited to a pre-determined distance between the bevel post and yoke. As seen in comparing FIG. 2(a) with FIG. 2(c), the deployed rail stop 30 holds the saw assembly at a distance 36 (FIG. 2(a)) from the bevel post 22. This distance is calibrated so that the structure of the saw assembly does not interfere with a large workpiece, such as the workpieces shown in FIGS. 1(a)-(b). It can be appreciated that the rail stop 30 operates as a stop rather than as a lock so that the rail stop may be deployed prior to movement of the saw assembly 12. With the rail stop deployed, the operator can advance the saw assembly and rail assembly 20 along the bevel post 22 without fear that the saw assembly will interfere with the workpiece on the platform 14. Thus, the operator can perform a slide cut on the large workpiece. If a chop cut is to be performed, the moment applied to the saw assembly to make the cut will keep the yoke 24 pressed against the rail stop 30. When the rail stop is not required it can be retracted to the position shown in FIGS. 2(c)-(d).

Figure 4A:
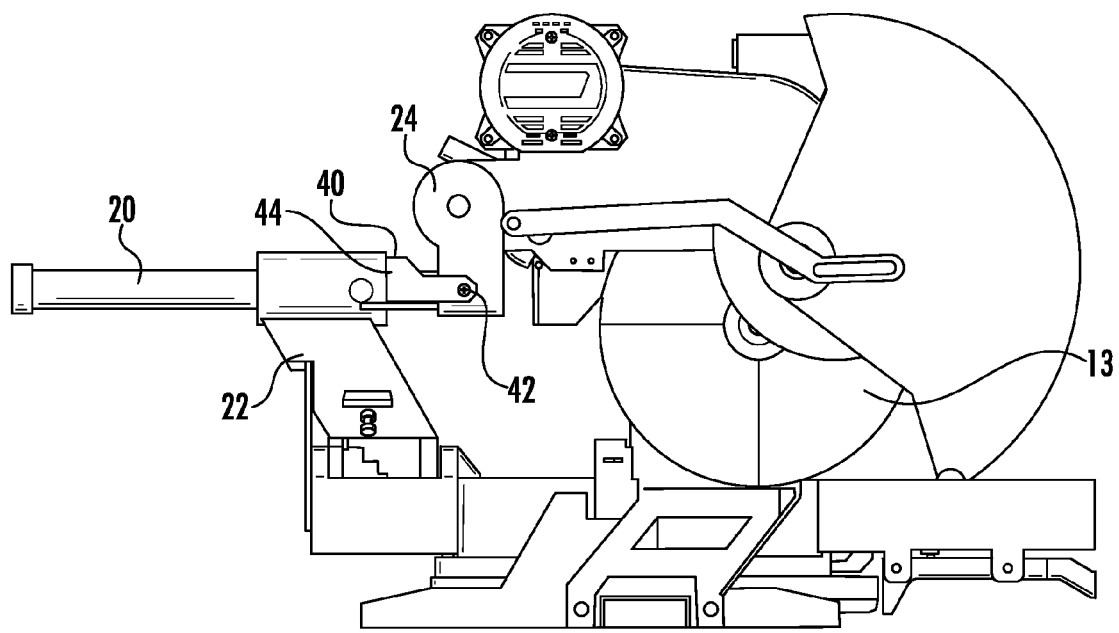
FIGS. 4(a)-(b) are views of an alternative rail stop incorporated into a sliding miter saw, such as the saw of FIGS. 1(a)-(b), with the rail stop shown in deployed and retracted positions.
Figure 4B:
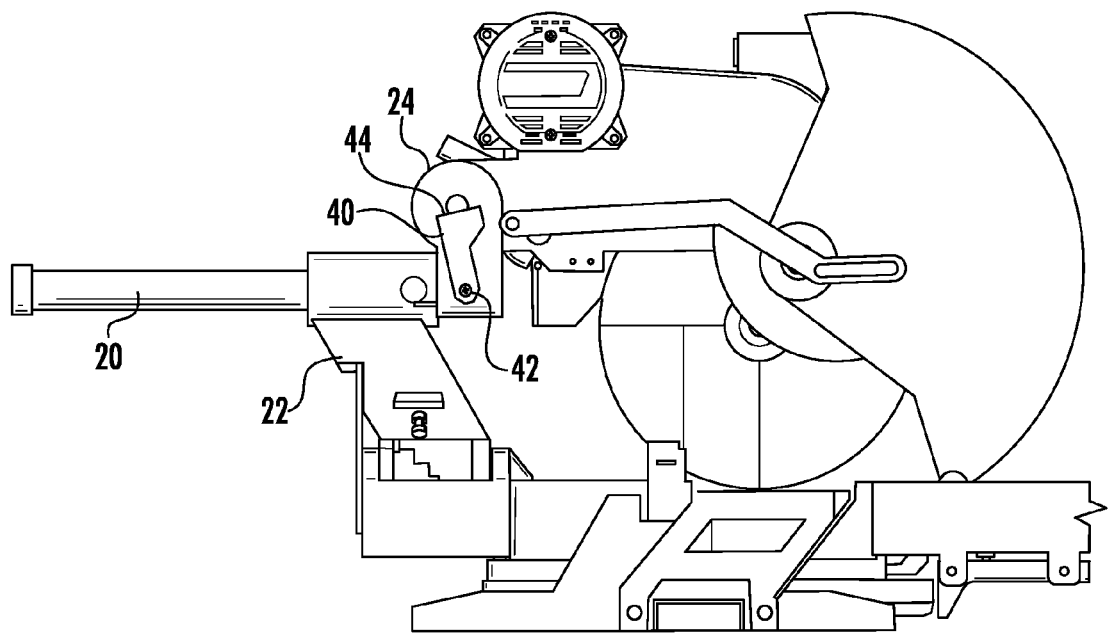

Other embodiments of the rail stop are contemplated as illustrated in FIGS. 4-5. The rail stop 40 shown in FIGS. 4(a)-(b) is mounted to the yoke 24 at a pivot mount 42, rather than to the bevel post as in the previous embodiment. The rail stop 40 includes the same right angle end portion 44 that is configured to abut the bevel post 22 instead of the yoke as in the previous embodiment. The rail stop 40 is otherwise similar in structure and operation to the rail stop 30.

Figure 5A:
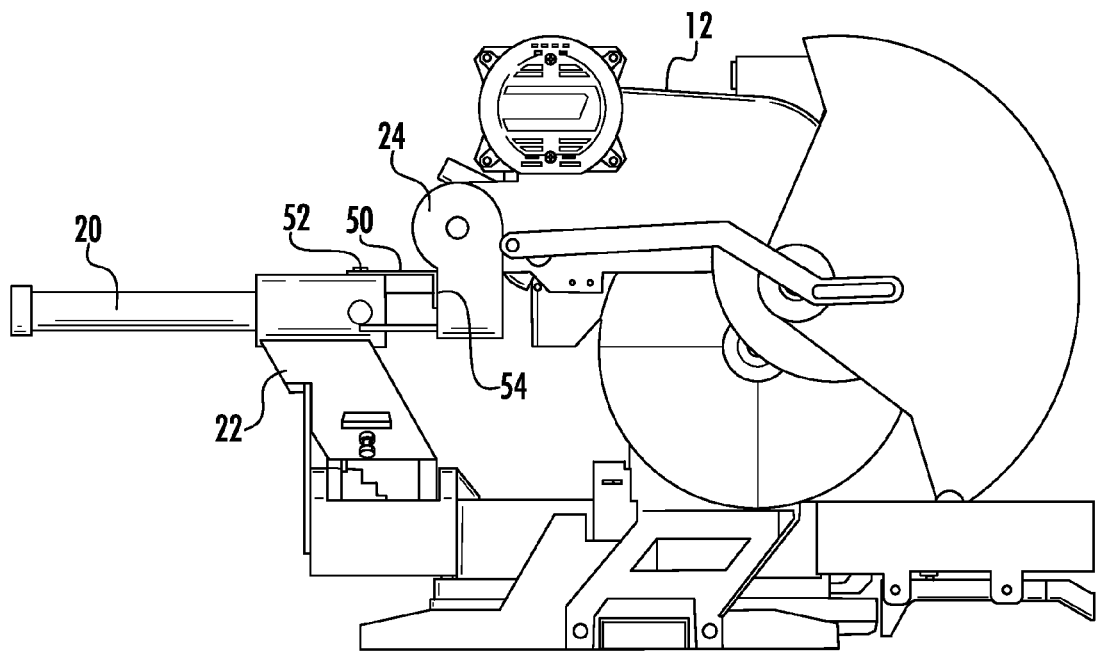
FIGS. 5(a)-(c) are views of another rail stop incorporated into a sliding miter saw, such as the saw of FIGS. 1(a)-(b), with the rail stop shown in deployed and retracted positions.
Figure 5B:
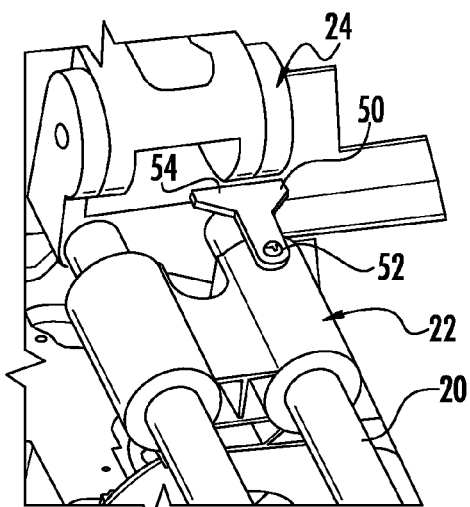
Figure 5C:
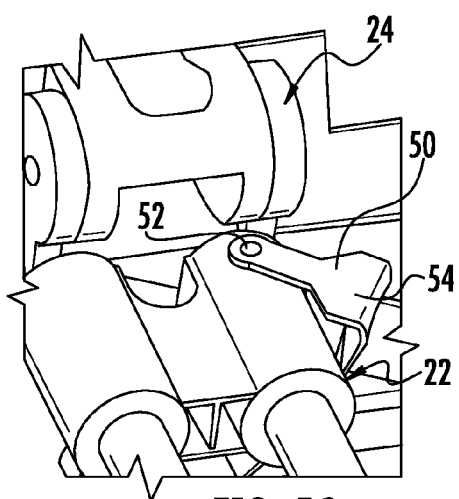

A rail stop 50 shown in FIGS. 5(a)-(c) is mounted to the bevel post at a pivot mount 52 that is situated on the top of the bevel post 22, rather than on the side of the bevel post as in the first disclosed embodiment, so that the rail stop pivots in a horizontal plane relative to the base. Like the stops 30 and 40, the rail stop 50 includes a right angle end portion 54 that abuts the yoke 24 to limit the travel of the slide rail assembly 20 and saw assembly 12 in the same manner as the prior embodiments.

Figure 6A:
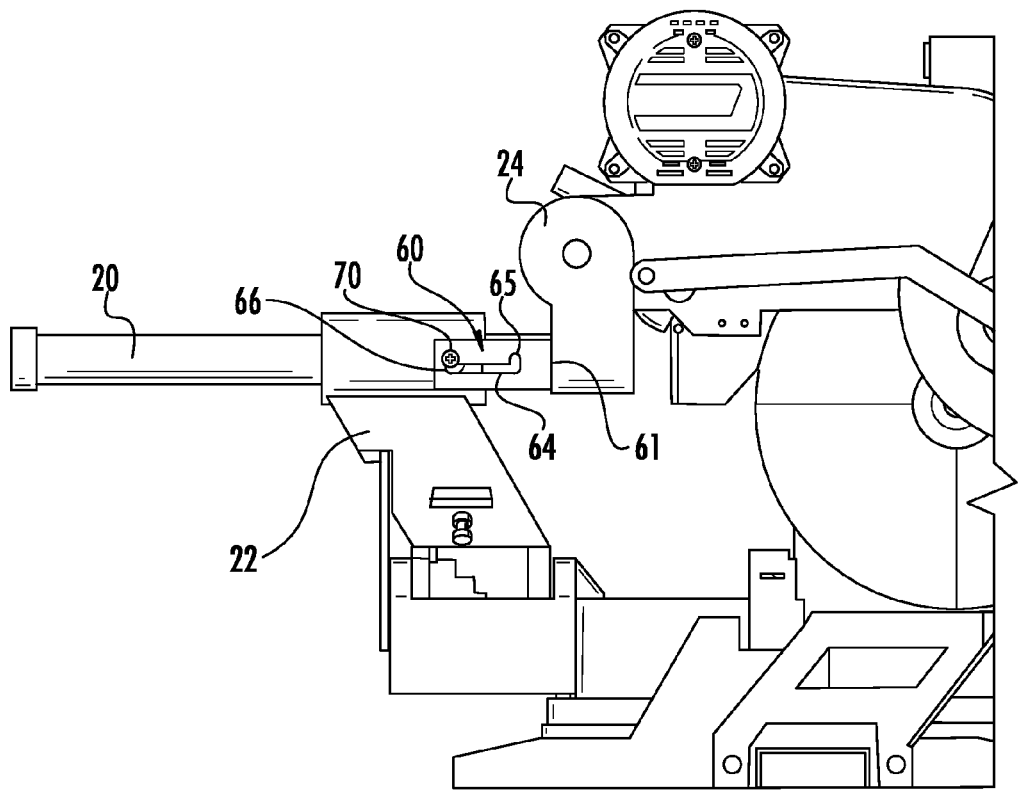
FIGS. 6(a)-(b) are views of yet another rail stop incorporated into a sliding miter saw, such as the saw of FIGS. 1(a)-(b), with the rail stop shown in deployed and retracted positions.
Figure 6B:
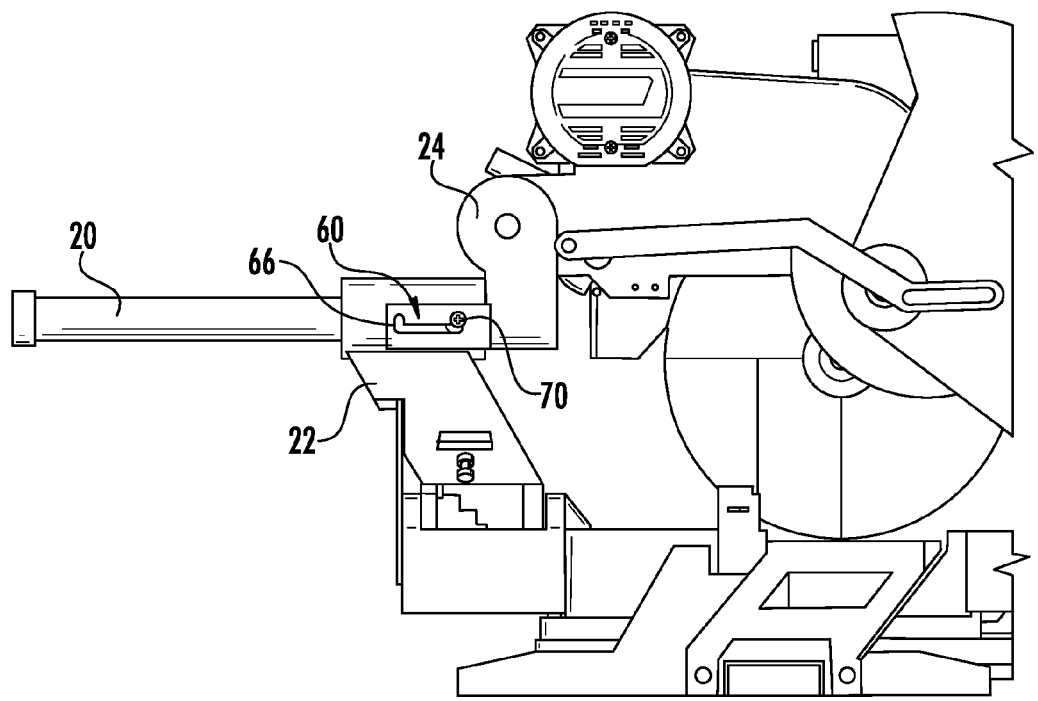

In a further embodiment, a rail stop 60 shown in FIGS. 6(a)-(b) is in the form of a flat plate 62 terminating in a right angle end portion 61 defining a stop surface similar to the end portions described above. However, rather than pivoting between deployed and retracted positions, the rail stop 60 slides or translates relative to the bevel post 22. The rail stop 60 includes a slot 64 extending along the length of the stop, terminating at its opposite ends in notches 65 and 66, as shown in the detail view of FIG. 7. The notches are configured to receive a pin 70 projecting from the side of the bevel post 22. In a deployed first position shown in FIG. 6(a) the pin 70 is disposed in the notch 66 so that the end portion 61 abuts the yoke 24 at a pre-defined first distance from the bevel post 22. When the rail stop 60 is in its retracted second position shown in FIG. 6(b) the pin 70 is disposed in the notch 65 at the opposite end of the stop. In the second position the end portion 61 is at a second distance from the bevel post that is less than the first distance. In a specific embodiment, in the second position the end portion 61 is immediately adjacent the bevel post. It can be appreciated that in the second position the end portion may still abut the yoke 24 when the rail system is at one end of movement, but the second distance in this position is generally simply the thickness of the plate 62.

Figure 7:
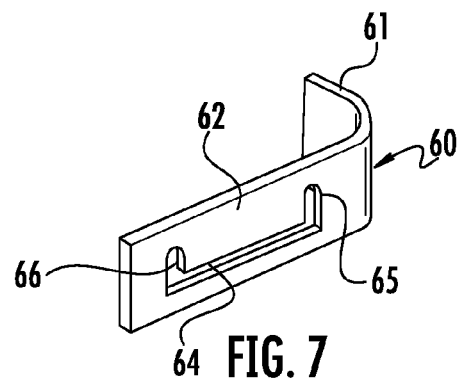
FIG. 7 is an enlarged perspective view of a rail stop plate according to a further aspect of the present disclosure.
Figure 8:
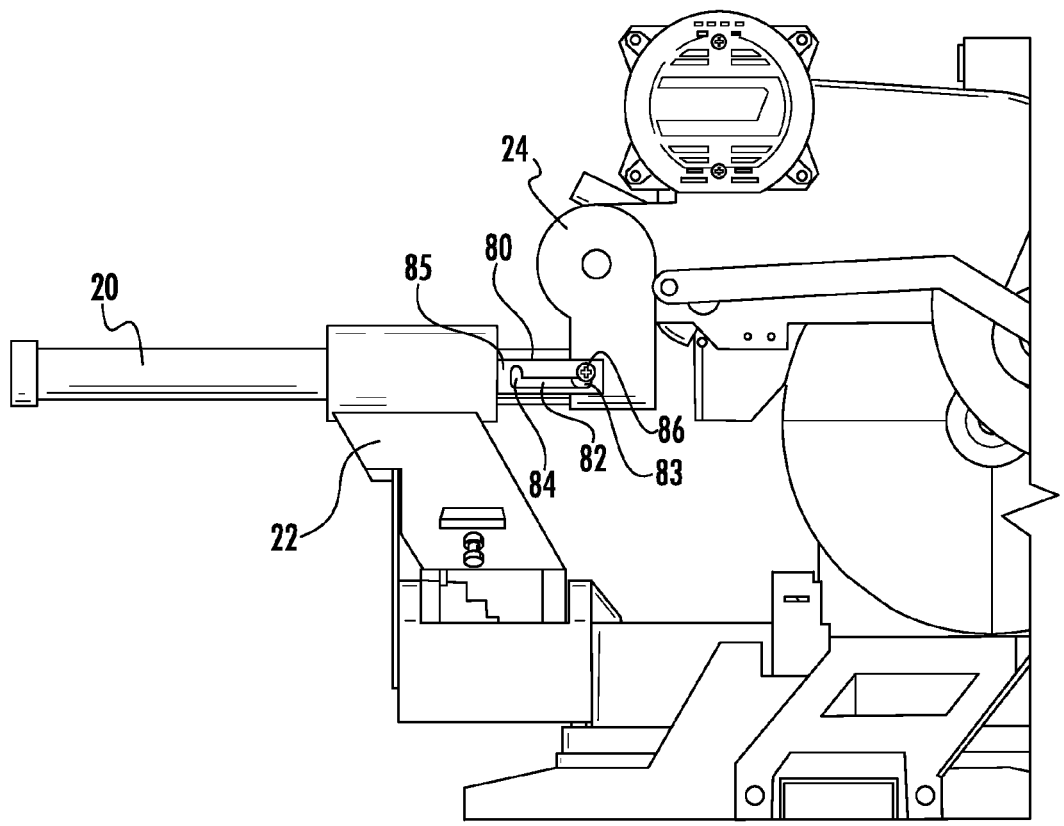
FIG. 8 is a side view of a rail stop similar to the rail stop of FIGS. 6(a)-(b) but slidably with the rails top plate, as shown in FIG. 7, mounted to the yoke of the power tool.

In a further embodiment, a rail stop 80, shown in FIG. 8, is similar to the rail stop 60 depicted in FIGS. 6a, 7 except that the rail stop is mounted to the yoke rather than to the bevel post. The rail stop 80 is in the form of a flat plate terminating in a right angle end portion 85 that abuts the bevel post and including a slot 82 extending along the length of the stop, terminating at its opposite ends in notches 83, 84 similar to the notches in FIG. 7. A pin 86 projects from the side of the yoke to engage the slot 82, instead of projecting from the side of the bevel post as in the prior embodiment. In the deployed position shown in FIG. 8, the pin is disposed in the notch 83 farthest from the bevel post. In the retracted position (not shown), the pin 86 is situated in the notch 84 that is nearest the bevel post, so that the rail stop 80 does not interfere with the rails moving directly against the bevel post, as shown in FIG. 6(b).

It is contemplated that the rail stops 60, 80 may include only one notch, namely notch 66 and 86, to hold the rail stop in its extended first position (FIGS. 6(a), 8). It is further contemplated that the slots 64, 82 may define intermediate notches between the ends of the slot. The intermediate notches would receive the post in the same manner as the notches 65, 66, 83, 84 but would operate to hold the rail stop at different intermediate distances as desired by the tool operator.

The rail stops 30, 40, 50, 60 and 80 may be formed of a rigid material capable of withstanding pressure when the saw is used to make a chop cut, or impact when the saw is used to make a slide cut. Preferably the rail stops are formed of a metal, such as stainless steel. The rail stops may incorporate a dampening material, such as a thin foam layer to provide some damping when the stop is contacted during a slide cut. The configuration of the rail stops and their respective pivot or slide mounts may be modified according to the structure of the power tool. For instance, while the illustrated embodiments the end portions project at a right angle relative to elongated plate portion of the rail stop, the end portions may project at a non-perpendicular angle provided that the stop surface can solidly abut the yoke or bevel post during a cut.

It can be appreciated that the rail stops disclosed herein may be readily retrofit to an existing power tool. For instance, the pivot mount 32 for the rail stop 30 of FIGS. 2(a)-(d) may be engaged to the bevel post 22 by a screw. Similarly, the pin 70 of the embodiment shown in FIG. 6(a)-(b) may also be a screw threaded into the bevel post, with the head of the screw holding the rail stop 60 in position relative to the bevel post.

The present disclosure provides a rail stop for a slide miter saw or similar power tool in which the rail stop is movable from a retracted position in which the saw assembly and rail assembly are free to move to their full extent, to an extended position in which the movement of the saw and rail assemblies is limited to a predetermined position that provides clearance for large workpieces. The rail stop thus allows a conventional miter saw to be used to make cuts in crown molding, large base boards and the like.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A power tool, comprising:
a power tool assembly supported by a yoke;
at least one elongated rail supporting the yoke;
a support mounted to a base and configured to support the at least one elongated rail, wherein the yoke and power tool assembly are movable relative to the base and the support;
a pivot supported by one of the yoke and the support; and
a rail stop supported by the pivot and movable with respect to the yoke and the support, wherein
the rail stop includes a first plate portion mounted to the pivot and a second plate portion mounted to the pivot through the first plate portion,
in a first configuration, (i) the first plate portion is in a first location which is not directly between the yoke and the support, (ii) the second plate portion is in a second location which is not directly between the yoke and the support, and (iii) the rail stop does not interfere with relative movement between the yoke and the support, and
in a second configuration (i) the first plate portion is in a third location which is not directly between the yoke and the support, (ii) the second plate portion is in a fourth location which is directly between the yoke and the support, and (iii) the rail stop precludes relative movement of the yoke and the support toward each other at a first separation distance, and does not preclude relative movement of the yoke and the support away from each other.

2. The power tool of claim 1, wherein the rail stop includes a cut-out configured to extend around a portion of the at least one elongated rail.

3. The power tool of claim 1, wherein the first plate portion extends in a first plane parallel to the at least one rail.

4. The power tool of claim 3, wherein the first plane is a vertical plane relative to a workpiece when the power tool assembly is configured to make a 90° cut in the workpiece.

5. The power tool of claim 3, wherein at least one elongated rail comprises a first rail and a second rail.

6. The power tool of claim 5, wherein the first rail and the second rail define a second plane parallel to the first plane.

7. The power tool of claim 6, wherein the first plane is a horizontal plane relative to a workpiece when the power tool assembly is configured to make a 90° cut in the workpiece.

8. The power tool of claim 1, wherein:
the rail stop first plate portion includes a pivot receiving portion mounted to the pivot through which the rail stop is supported by the pivot, and having a first side proximate the one of the yoke and the support, and a second side opposite the first side and distal to the one of the yoke and the support;
the rail stop second plate portion includes a stop surface portion;
the first side of the pivot receiving portion extends in a first plane perpendicular to the pivot;
the second side of the pivot receiving portion extends in a second plane perpendicular to the pivot;
the first and second planes define a path volume therebetween; and
the stop surface portion is adapted to abut the other of the yoke and the support at a location outside of the path volume when the rail stop is in the second configuration such that the rail stop ensures a minimum separation distance between the support and the yoke while not interfering with movement of the support and the yoke away from each other.

9. The power tool of claim 8, wherein the rail stop includes a cut-out configured to extend around a portion of the at least one elongated rail.

10. The power tool of claim 8, wherein the first plate portion extends in a plane parallel to the at least one rail.

11. The power tool of claim 8, wherein
the base defines a work surface; and
the first plane is a vertical plane relative to the work surface when the power tool assembly is configured to make a 90° cut in a workpiece supported on the work surface.

12. The power tool of claim 8, wherein the first plane is a horizontal plane relative to the work surface when the power tool assembly is configured to make a 90° cut in a workpiece supported on the work surface.

13. The power tool of claim 8, wherein the at least one elongated rail comprises a first rail and a second rail.

14. The power tool of claim 13, wherein the first rail and the second rail define a third plane orthogonal to the first plane.

* * * * *

UNITED STATES PATENT AND TRADEMARK OFFICE
CERTIFICATE OF CORRECTION

| | | |
|---|---|---|
| PATENT NO. | : 11,148,214 B2 | Page 1 of 1 |
| APPLICATION NO. | : 16/585298 | |
| DATED | : October 19, 2021 | |
| INVENTOR(S) | : Marinov et al. | |

It is certified that error appears in the above-identified patent and that said Letters Patent is hereby corrected as shown below:

In the Claims

In Claim 5, at Column 5, Lines 47-48: "wherein at least one elongated rail comprises" should read --wherein the at least one elongated rail comprises--.

Signed and Sealed this
Nineteenth Day of April, 2022

Katherine Kelly Vidal
*Director of the United States Patent and Trademark Office*